United States Patent
Muramatsu

(10) Patent No.: US 6,788,026 B2
(45) Date of Patent: Sep. 7, 2004

(54) BATTERY CHARGER, INCLUDING AN AMPLIFIER FOR AUDIO SIGNALS, FOR PORTABLE AUDIO DEVICES

(75) Inventor: Toshihiko Muramatsu, Iwata-gun (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/228,766

(22) Filed: Aug. 27, 2002

(65) Prior Publication Data

US 2003/0042868 A1 Mar. 6, 2003

(30) Foreign Application Priority Data

Aug. 30, 2001 (JP) ............................ P2001-262177

(51) Int. Cl.$^7$ ............................................ H01M 10/46
(52) U.S. Cl. .................................................. 320/107
(58) Field of Search ........................... 320/107, 111, 320/112, 113, 114, 115; 455/557, 569.1, 569.2, 570, 575.1

(56) References Cited

U.S. PATENT DOCUMENTS

| | | | |
|---|---|---|---|
| 5,479,479 A | * 12/1995 | Braitberg et al. | 455/404.1 |
| 5,642,402 A | * 6/1997 | Vilmi et al. | 455/569.2 |
| 6,052,603 A | * 4/2000 | Kinzalow et al. | 455/557 |
| 6,076,000 A | * 6/2000 | Lee | 455/569.2 |
| 6,108,567 A | * 8/2000 | Hosonuma | 455/569.2 |
| 6,509,716 B2 | * 1/2003 | Yi | 320/115 |

FOREIGN PATENT DOCUMENTS

| | | |
|---|---|---|
| JP | 4-132695 | 12/1992 |
| JP | 10-313257 | 11/1998 |
| JP | 11-146571 | 5/1999 |
| JP | 2000-286929 | 10/2000 |
| JP | 2001-52761 | 2/2001 |
| JP | 2001-223536 | 8/2001 |

* cited by examiner

Primary Examiner—Edward H. Tso
(74) Attorney, Agent, or Firm—Pillsbury Winthrop LLP

(57) ABSTRACT

A battery charger is used for charging a battery incorporated in a portable audio device such as a portable telephone, and it comprises a connector and a circuit block for performing charging operation with the battery of the portable audio device via the connector. The circuit block contains a digital power amplifier that ensures digitization of audio signals transmitted thereto from the portable audio device via the connector. The battery charger can be connected with speakers, which produce sounds based on digital audio signals amplified by the digital power amplifier. Since the digital power amplifier has a good efficiency in power consumption and produces a very small amount of heat during operation, the battery charger can be considerably downsized, and it can reliably ensure a high quality reproduction of audio signals during charging operation for the battery of the portable audio device in progress.

19 Claims, 8 Drawing Sheets

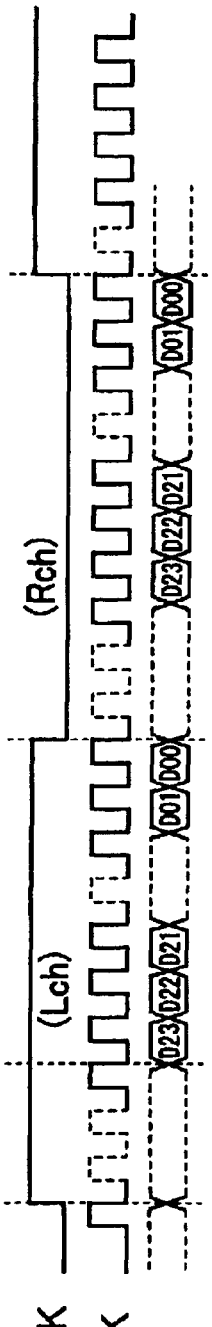
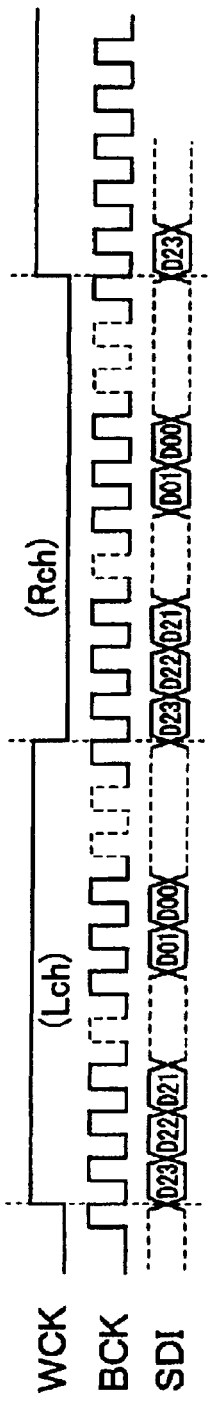
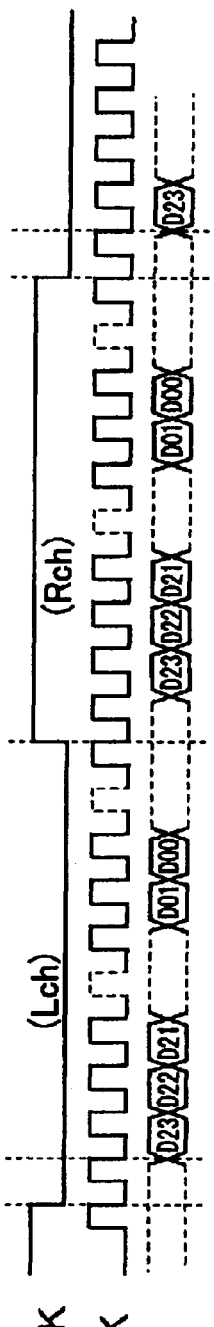
FIG. 7A
FIG. 7B
FIG. 7C
FIG. 7D
FIG. 7E
FIG. 7F
FIG. 7G
FIG. 7H
FIG. 7I

BATTERY CHARGER, INCLUDING AN AMPLIFIER FOR AUDIO SIGNALS, FOR PORTABLE AUDIO DEVICES

BACKGROUND OF THE INVENTION

1. Field of the Invention

This invention relates to battery chargers for charging batteries incorporated in portable audio devices such as portable telephones. This invention also relates to audio systems comprising portable audio devices and battery chargers.

2. Description of the Related Art

Until now, no battery chargers are designed and developed for portable audio devices such as portable telephones (e.g., cellular phones) incorporating amplifiers for use in reproduction of hi-fi (or high-fidelity) audio signals. Portable audio devices can be used as constituent elements of audio systems. FIG. 9 shows a typical example of an audio system incorporating a portable audio device. Specifically, the audio system of FIG. 9 is constituted by connecting together a portable audio device 1 with speakers 2A and 2B incorporating amplifiers (not shown). These speakers 2A and 2B are connected together by a speaker cord 3, while the portable audio device 1 is connected with the speaker 2A by an analog audio signal cord 4. In addition, the speaker 2B has a tone volume control for adjusting the tone volume thereof. Further, both the portable audio device 1 and the speaker 2A are connected with AC/DC convertible power adapters 6 via power supply cords 5.

Japanese Unexamined Patent Publication No. Hei 10-313257 discloses a battery charger having a radio reception function for a portable telephone. This battery charger has a loudspeaker to provide a loudspeaker function of radio sound. Japanese Unexamined Patent Publication No. 2000-286929 discloses a battery charger for a portable telephone that allows conversation while the charging operation is in progress.

In order to constitute the audio system incorporating the portable audio device as shown in FIG. 9, both the portable audio device 1 and the speaker 2A incorporating an amplifier require power sources independently. Therefore, the audio system may have a temporal appearance using cords and is not compact. That is, this audio system lacks comprehensive operability.

In addition, it may be difficult to use the aforementioned audio system in situations in which the user is listening to music from speakers while the charging operation of a battery of a portable audio device is in progress using an indoor AC power source.

The battery charger disclosed in Japanese Unexamined Patent Publication No. Hei 10-313257 is designed under the precondition where analog audio signals given from a portable telephone incorporating a radio are amplified by a linear amplifier incorporated in a battery charger. Herein, the power amplification efficiency of the linear amplifier may normally range from 20% to 25%, so that it may require power consumption ranging from 1.7 W to 2.3 W in order to produce outputs of (0.5 W to 1.0 W)×2 channels, whereas the remaining power ranging from 85% to 70% may cause heat in the amplifier. For this reason, a heat radiation board or space should be necessary in the battery charger in order to ensure sufficient heat radiation or dissipation in the amplifier. This causes problems in downsizing of the battery charger and in increasing of the amplifier output.

In addition, the aforementioned battery charger is designed to input analog audio signals. Therefore, when the source voltage of the portable telephone is reduced for the purpose of the conservation of electric energy, amplitudes of analog audio signals should be correspondingly reduced so that the portable telephone could not provide high sound quality.

Because of the relatively large power consumption of the amplifier, in order to charge the battery in a short period of time by securing sufficient charging power, it is necessary to employ the following measures:

(i) To increase the size of the power source circuit and the size of the battery charger; and
(ii) To use a small-output amplifier in order to reduce electric power consumed in the amplifier.

The battery charger disclosed by Japanese Unexamined Patent Publication No. 2000-286929 incorporates a speaker and a small-output linear amplifier for the purpose of conversation using the portable telephone. Therefore, this battery charger is not appropriate for the realization of a high sound quality based on digital audio signals because it provides small amplifier output and operates based on analog signals only.

SUMMARY OF THE INVENTION

It is an object of the invention to provide an audio system incorporating a battery charger that can charge a battery of a portable audio device such as a portable telephone using an indoor AC power source while allowing reproduction of audio signals by speakers.

A battery charger is used for charging a battery incorporated in a portable audio device such as a portable telephone, and it comprises a connector and a circuit block for performing charging operation with the battery of the portable audio device via the connector. The circuit block contains a digital power amplifier that ensures digitization of audio signals transmitted thereto from the portable audio device via the connector. The battery charger can be connected with speakers, which produce sounds based on digital audio signals amplified by the digital power amplifier. Since the digital power amplifier has a good efficiency in power consumption and produces a very small amount of heat during operation, the battery charger can be considerably downsized, and it can reliably ensure a high quality reproduction of audio signals during charging operation for the battery of the portable audio device in progress.

In the above, the battery charger uses a 16-pin connector that includes at least one charging terminal and a plurality of terminals for use in transmission of signals with respect to the portable audio device. In addition, a selector can be installed in the battery charger to allow the user to manually select a desired terminal for transmission of signals. The digital power amplifier may include a PCM/PWM converter, a pulse-width modulator, a power driver, and switching transistors, for example.

An audio system can be constituted using a portable audio device and a battery charger. Herein, the battery charger merely requires a single power source for both the charging operation and playback operation with respect to the portable audio device.

BRIEF DESCRIPTION OF THE DRAWINGS

These and other objects, aspects, and embodiments of the present invention will be described in more detail with reference to the following drawings, in which:

FIG. 7A shows a word clock signal WCK in relation to Mode_1;

FIG. 7B shows a bit clock signal BCK in relation to Mode_1;

FIG. 7C shows digital audio signals SDI whose data elements are arranged in relation to Mode_1;

FIG. 7D shows a word clock signal WCK in relation to Mode_2;

FIG. 7E shows a bit clock signal BCK in relation to Mode_2;

FIG. 7F shows digital audio signals SDI whose data elements are arranged in relation to Mode_2;

FIG. 7G shows a word clock signal WCK in relation to Mode_3;

FIG. 7H shows a bit clock signal BCK in relation to Mode_3;

FIG. 7I shows digital audio signals SDI whose data elements are arranged in relation to Mode_3;

DESCRIPTION OF THE PREFERRED EMBODIMENT

This invention will be described in further detail by way of examples with reference to the accompanying drawings.

Figure 1:
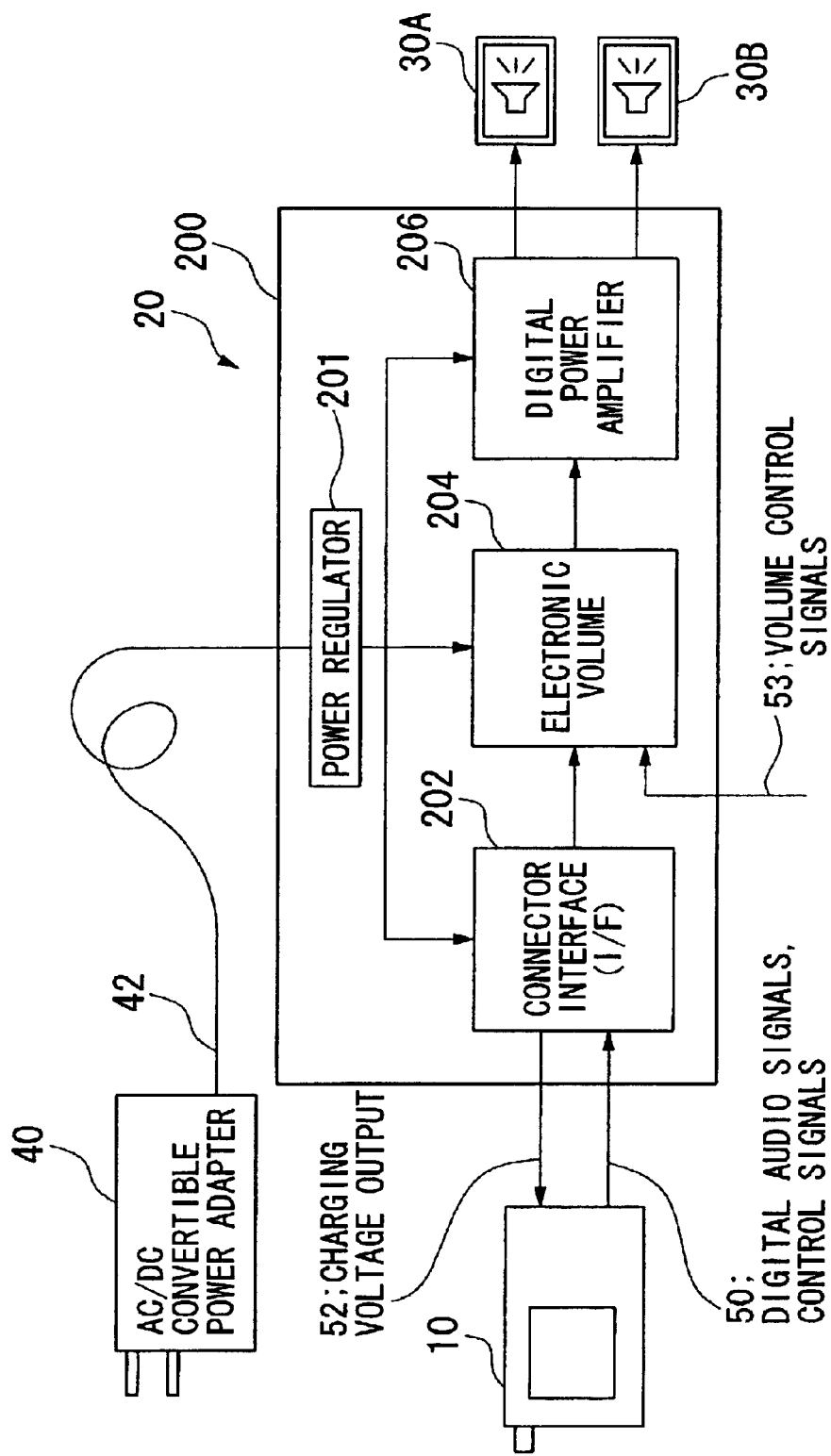
FIG. 1 is a block diagram showing the overall configuration of an audio system incorporating a portable audio device and a battery charger in accordance with a preferred embodiment of the invention.

FIG. 1 shows the overall configuration of an audio system incorporating a portable audio device and a battery charger in accordance with the preferred embodiment of the invention. Specifically, the audio system of FIG. 1 comprises a portable audio device 10 such as a portable information device (e.g., PDA device) and a portable telephone (e.g., cellular phone), a battery charger 20 for charging a battery incorporated in the portable audio device 10, and a pair of speakers 30A and 30B, which are connectible with the battery charger 20.

A base unit 200 of the battery charger 20 is connected with an AD/DC convertible power adapter 40 via a power supply cord 42 and a connector (not shown), wherein the AC/DC convertible power adapter 40 operates based on the indoor AC power supply to convert AC power supply to DC power supply.

Specifically, the base unit 200 of the battery charger 20 comprises a power regulator 201 for regulating DC source voltage given from the AC/DC convertible power adapter 40 into DC voltage having a prescribed level, a connector interface (I/F) 202, an electronic volume 204, and a digital power amplifier 206.

The portable audio device 10 is connected with the base unit 200 of the battery charger 20 via a connector (not shown). In addition, the speakers 30A and 30B are externally arranged and are connected with the base unit 200 of the battery charger 20 via connectors (not shown).

In the audio system of FIG. 1, the AC/DC convertible power adapter 40 converts indoor AC source voltage of 100 V to DC voltage of 5 V or so, which is supplied to the base unit 200 of the battery charger 20. The base unit 200 of the battery charger 20 supplies the portable audio device 10 with the DC voltage as charging voltage output thereof Therefore, the DC voltage output from the battery charger 20 is used to charge the battery incorporated in the portable audio device 10.

The DC voltage given from the AC/DC convertible power adapter 40 is supplied to the power regulator 201, which in turn converts the DC voltage into prescribed voltages suited for the connector interface 202, electronic volume 204, and digital power amplifier 206 to operate. Generally speaking, the power regulator 201 outputs the prescribed range of DC voltages, which ranges from 4.5 V to 5.5 V. The connector interface 202 is connected with a signal connector of the portable audio device 10, so that it receives digital audio signals and control signals (which are denoted by reference numeral '50') from the portable audio device 10. These signals are forwarded to the electronic volume 204.

The electronic volume 204 converts digital audio signals to analog signals, which are adequately adjusted in tone volume based on control signals supplied thereto from the portable audio device 10. In addition, the tone volume adjustment can be realized by using volume control signals 53 in the base unit 200 of the battery charger 20.

The digital power amplifier 206 amplifies analog signals output from the electronic volume 204 up to the level that is sufficient for driving the speakers 30A and 30B. Amplified analog signals are supplied to the speakers 30A and 30B.

The present embodiment uses a high efficiency type of digital power amplifier 206, whose efficiency ranges from 80% to 90, and whose output is about 2.5 W in order to suppress the heat radiated thereof.

Therefore, it is possible to freely determine the size of the base unit 200 of the battery charger 20 without considering restrictions in dimensions due to heat radiation of the amplifier.

The present embodiment arranges the speakers 30A and 30B externally to the base unit 200 of the battery charger 20. When the base unit 200 of the battery charger 20 can be increased in dimensions to some extent, it is possible to incorporate the speakers 30A and 30B into the base unit.

Figure 2:
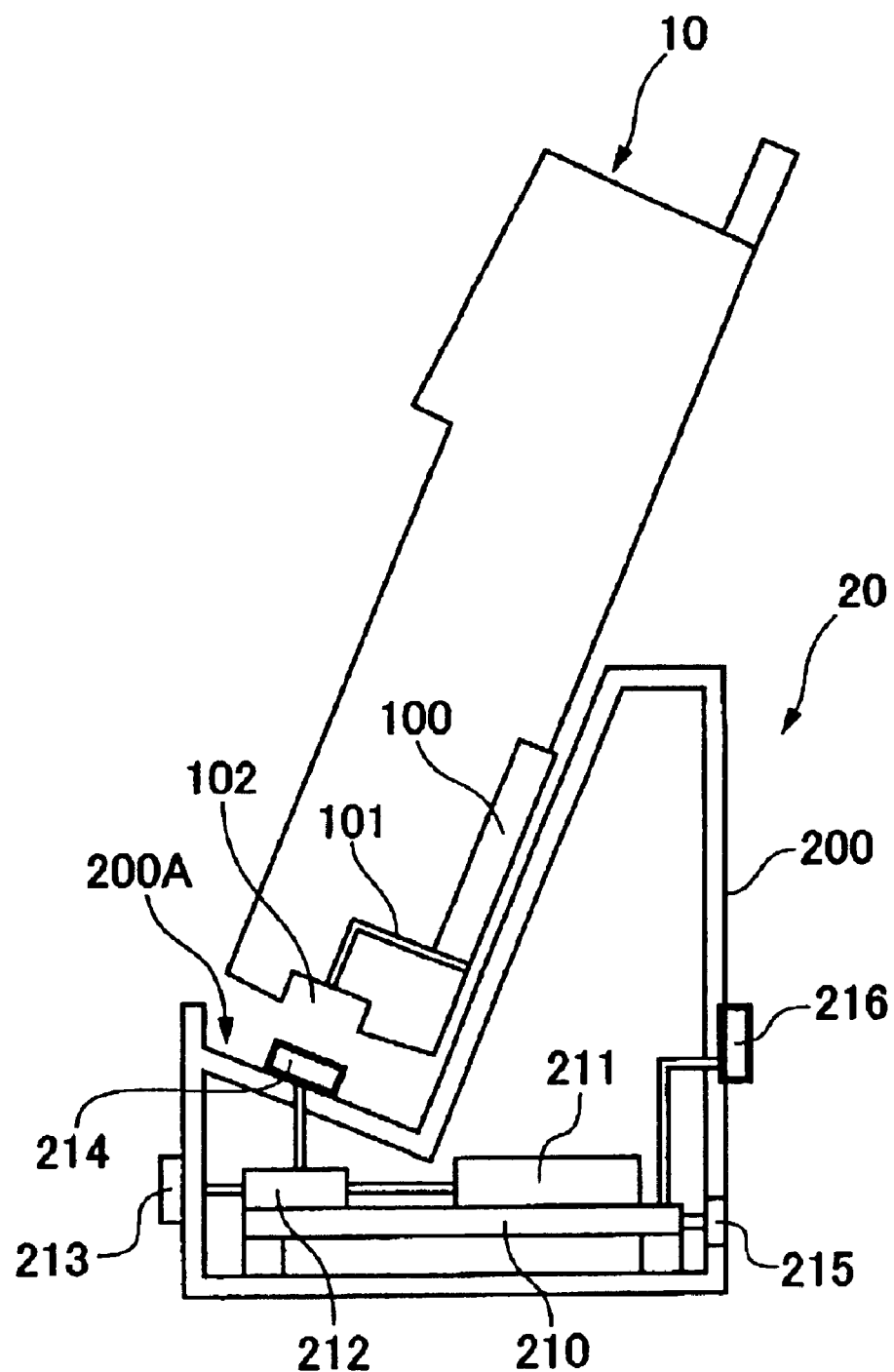
FIG. 2 is a cross-sectional view diagrammatically showing internal configurations of the portable audio device attached to the battery charger shown in FIG. 1.

FIG. 2 diagrammatically shows a cross-sectional structure of the portable audio device 10 that is attached to the battery charger 20 in order to charge the battery. Herein, a digital audio circuit 100 containing a digital signal processor (DSP) is installed in the portable audio device 10 and is connected with pins of a female type 16-pin connector 102 having a hollow shape, which is arranged in the bottom portion of the portable audio device 10.

Internal parts such as the power regulator 201, connector interface 202, and digital power amplifier 206 as well as a circuit block 211 (including a DC charging circuit) and a selector 212 (not shown in FIG. 1) are mounted on a printed circuit board 210 in the base unit 200 of the battery charger 20.

In addition, a selector switch 213 that is used to operate the selector 212 is arranged on one side of the base unit 200 of the battery charger 20. Further, a connector 215 for connecting with the AC/DC convertible power adapter 40 and a speaker connector 216 for connecting with a cable (not shown), which is connected with input terminals of external speakers, are arranged on the other side of the base unit 200 of the battery charger 20.

Figure 3:
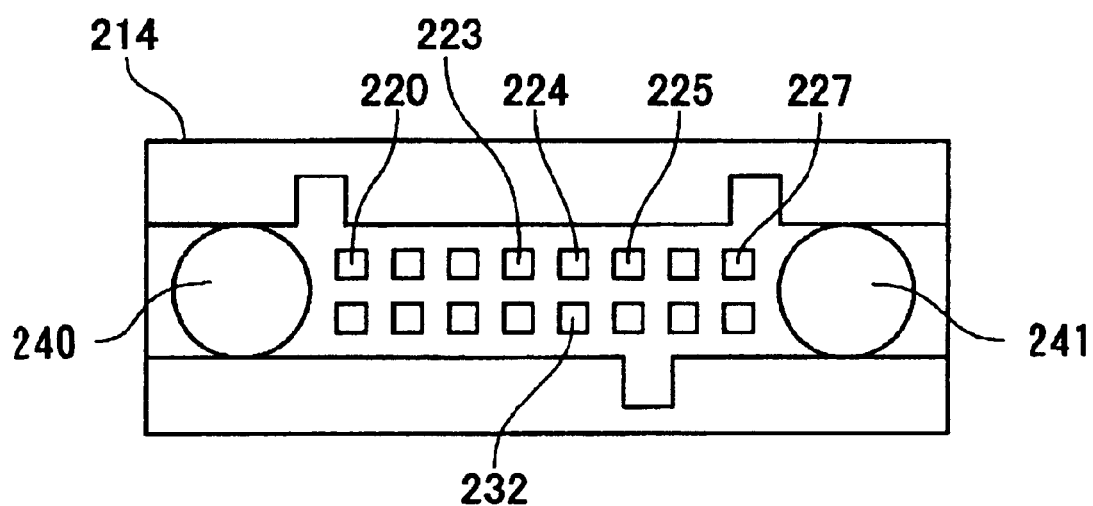
FIG. 3 shows the exterior appearance of a male type 16-pin connector arranged in the base unit of the battery charger shown in FIG. 2.

In a charging mode, the portable audio device 10 is mounted on a mount portion 200A of the base unit 200 of the battery charger 20. The mount portion 200A provides a male type 16-pin connector 214, which is connected with the female type 16-pin connector 102 arranged in the bottom portion of the portable audio device 10. FIG. 3 shows the exterior structure of the male type 16-pin connector 214, which is arranged in the mount portion 200A of the base unit 200 of the battery charger 20. Circular engagement holes 240 and 241 are arranged in leftside and rightside areas of the connector 214, and sixteen pins are arranged in two rows in the center area of the connector 214. These pins are used for battery charging and signal transmissions with respect to the portable audio device 10.

Now, several pins 220, 223–225, 227, and 232 selected from among the sixteen pins of the connector 214 will be described in detail. That is, the upper leftmost pin 220 corresponds to the positive power terminal, while the upper rightmost pin 227 and the lower pin 232 correspond to negative power terminals. In addition, the pins 223 to 225 correspond to terminals for use in transmissions of prescribed signals from the portable audio device 10 to the battery charger 20. Specifically, the pin 223 is used to transmit a word clock (WCK) signal; the pin 224 is used to transmit a bit clock signal (BCK) L; and the pin 225 is used to transmit a serial data-in (SDI) signal, which represents digital audio signals. In the above, both the word clock signal (WCK) and bit clock signal (BCK) are synchronizing signals.

The pins 220 and 227 correspond to charging terminals that are used to charge the battery of the portable audio device 10.

Guide pins (not shown) attached to the female type 16-pin connector 102 are inserted into the engagement holes 240 and 241 when the portable audio device 10 is being mounted on the mount portion 200A of the base unit 200 of the battery charger 20, so that the female type 16-pin connector 102 of the portable audio device 10 is properly guided to and is engaged with the male type 16-pin connector 214 of the base unit 200.

The selector 212 and the selector switch 213 are used to select a desired terminal for use in signal transmission from among a plurality of terminals of the male type 16-pin connector 214. That is, they function as a terminal selector allowing the selected terminal to be connected with the prescribed input terminal of the circuit block 211 arranged in the base unit 200.

For example, by operating the selector switch 213, the selector 212 can arbitrarily select prescribed terminals allowing transmissions of digital audio signals and control signals such as synchronizing signals. This allows the base unit 200 of the battery charger 20 to cope with various types of portable audio device. That is, the battery charger 20 of the present embodiment has connectibility or compatibility with various types of portable audio devices.

Next, the internal configuration of the digital power amplifier 206 installed in the base unit 200 of the battery charger 20 will be described with reference to FIG. 4. The digital power amplifier circuit 206 comprises a PCM/PWM converter 2000 (where 'PCM' stands for 'Pulse-Code Modulation'; and 'PWM' stands for 'Pulse-Width Modulation'), a pulse-width modulator 2001, and a power driver 2002 as well as a switching transistor 2003 whose source is supplied with positive source voltage +Vdd, and a switching transistor 2004 whose source is supplied with negative source voltage −Vdd Drains of the switching transistors 2003 and 2004 are connected together at a connection point, which is connected with the 'external' speaker 30A or 30B.

The digital power amplifier 206 is connected with the digital audio circuit 100 of the portable audio device 10 via the male type 16-pin connector 214.

When the selector switch 213 is operated, it outputs a select signal to select a terminal (or terminals) for use in transmission of signals from the digital audio circuit 100 to the digital power amplifier 206.

When the battery of the portable audio device 10 is charged, the AC/DC convertible power adapter 40 supplies electric power to internal circuits of the digital power amplifier 206. In addition, it also supplies charging voltage to the portable audio device 10 via the male type 16-pin connector 214. Therefore, the battery of the portable audio device 10 is being charged under the charging voltage supplied thereto. In addition, both the digital audio circuit 100 and the digital power amplifier 206 are being activated, so that the portable audio device 10 is capable of transmitting digital audio signals to the digital power amplifier 206 via the male type 16-pin connector 214.

In the digital power amplifier 206, the PCM/PWM converter 2000 and the pulse-width modulator 2001 cooperate together to convert digital audio signals to pulse-width modulation (PWM) signals, which are forwarded to the power driver 2002. Based on the PWM signal, the power driver 2002 drives the switching transistors 2003 and 2004, thus outputting power-amplified audio signals to the speaker 30A or 30B.

Figure 4:
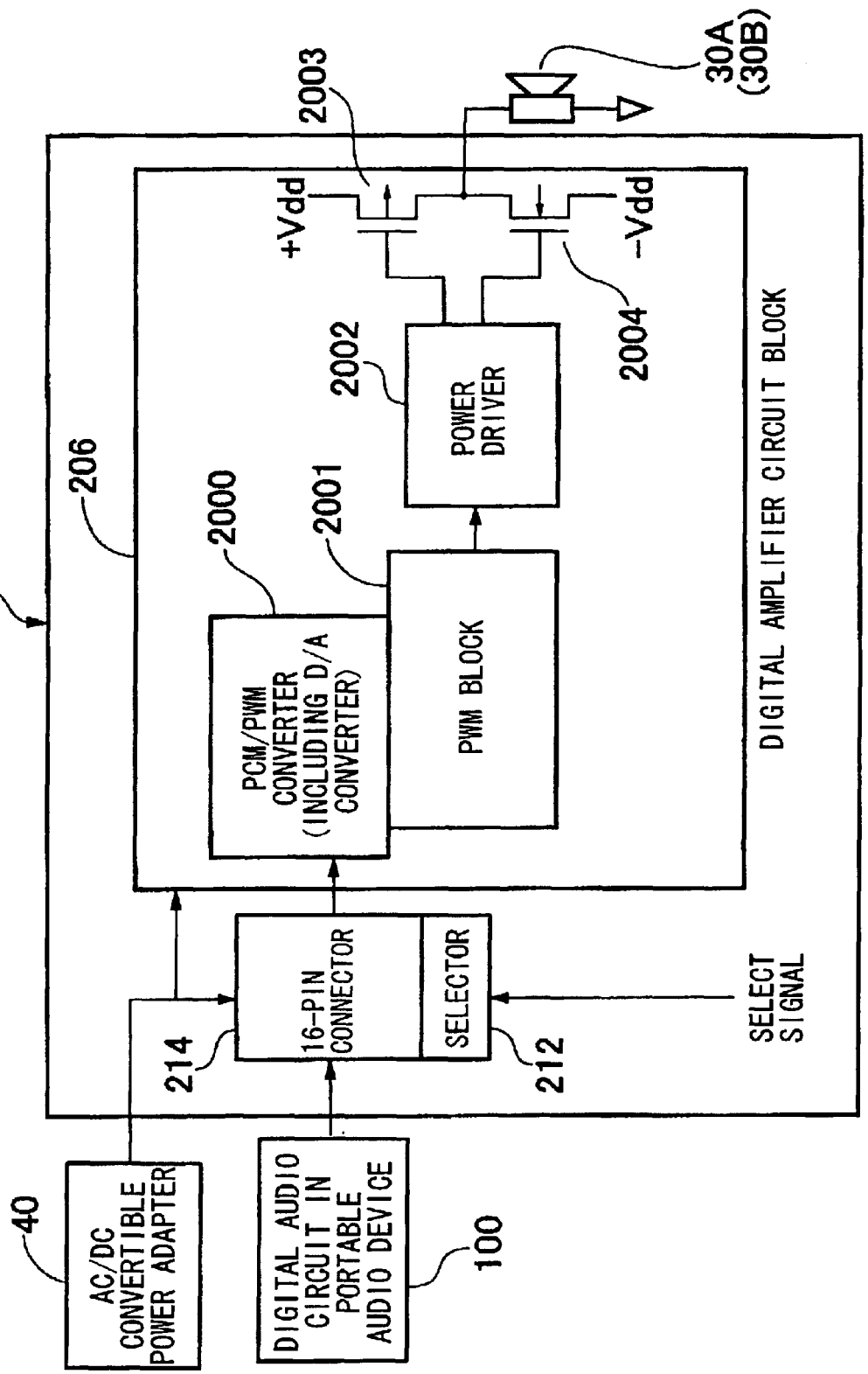
FIG. 4 is a block diagram showing the internal configuration of a digital power amplifier installed in the base unit of the battery charger in connection with an AC/DC convertible power adapter and a digital audio circuit of the portable audio device.

For the sake of the simplicity of explanation, FIG. 4 merely shows one series of the power driver, switching transistors, and speaker. Of course, there is provided another series of the power driver, switching transistors, and speaker, which are similar to those shown in FIG. 4; hence, the detailed illustration is omitted.

Figure 5:
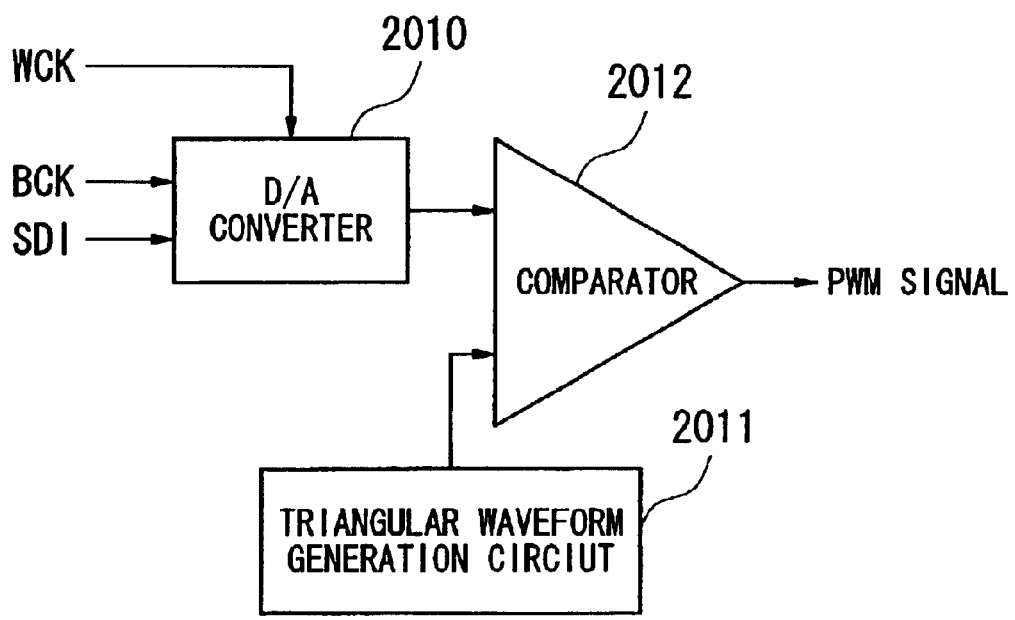
FIG. 5 shows one example of the specific configuration realized by a PCM/PWM converter and a pulse-width modulator arranged inside of the digital power amplifier shown in FIG. 4.

Next, an example of the specific configuration realized by the PCM/PWM converter 2000 and pulse-width modulator 2001 will be described with reference to FIG. 5. That is, the combination of the PCM/PWM converter 2000 and pulse-width modulator 2001 is realized by the combination of a digital-to-analog (D/A) converter 2010, a triangular waveform generation circuit 2011 for generating triangular waveform signals, and a comparator 2012.

The D/A converter 2010 is supplied with a word clock signal WCK (i.e., synchronizing signal), a bit clock signal BCK, and a digital audio signal SDI. Specifically, the D/A converter 2010 receives 24-bit digital audio signals SDI in synchronization with the bit clock signal BCK. Hence, the D/A converter 2010 converts 24-bit digital audio signals SDI to analog audio signals in synchronization with the word clock signal WCK.

Examples of relationships between word clock signals WCK, bit clock signals BCK, and digital audio signals SDI are shown in FIGS. 7A to 7I in relation to various modes, namely, Mode_1, Mode_2, and Mode_3.

Specifically, FIGS. 7A to 7C show an example of relationships between the word clock signal WCK, bit clock signal BCK, and digital audio signal SDI in relation to Mode_1 (namely, 'WCK backward load mode'). As shown in FIG. 7A, the word clock signal WCK alternatively changes the level thereof, so that a high-level duration and a low-level duration alternatively occur over the lapse of time, wherein the high-level duration corresponds to a left channel (Lch), and the low-level duration corresponds to a right channel (Rch). With respect to each channel, twenty-four data elements (namely, D23, D22, D21, . . . , D01, D00) of the 24-bit digital audio signal SDI are arranged in a backward loading manner from the trailing edge of the word clock signal WCK in synchronization with pulses of the bit clock signal BCK.

FIGS. 7D to 7F show an example of relationships between the word clock signal WCK, bit clock signal BCK, and digital audio signal SDI in relation to Mode_2 (namely, 'WCK forward load mode'). With respect to each channel, twenty-four data elements (namely, D23, D22, D21, . . . , D01, D00) of the 24-bit digital audio signal SDI are arranged in a forward loading manner from the leading edge of the word clock signal WCK in synchronization with pulses of the bit clock signal BCK.

FIGS. 7G to 7I show an example of relationships between the word clock signal WCK, bit clock signal BCK, and digital audio signal SDI in relation to Mode_3 (namely, 'IIS format mode'). With respect to each channel, data elements (namely, $D_{23}$, $D_{22}$, $D_{21}$, . . . , $D_{01}$, $D_{00}$) of the 24-bit digital audio signal SDI are arranged from the leading edge of a pulse that appears just after the leading edge of the word clock signal WCK in synchronization with pulses of the bit clock signal BCK.

The D/A converter 2010 converts digital audio signals SDI to analog signals, which are supplied to one input terminal of the comparator 2012. Thus, the comparator 2012 compares analog audio signals with the triangular waveform signal output from the triangular waveform generation circuit 2011, thus producing pulse-width modulation (PWM) signals. The PWM signals are supplied to the power driver 2002 shown in FIG. 4.

Figure 6:
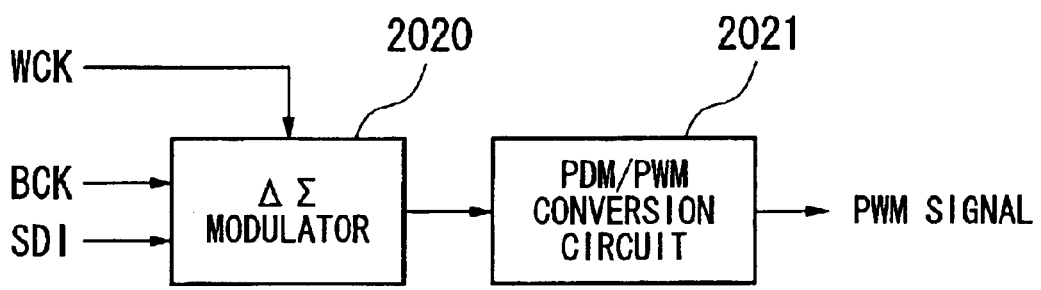
FIG. 6 shows another example of the specific configuration realized the PCM/PWM converter and pulse-width modulator arranged inside of the digital power amplifier shown in FIG. 4.

FIG. 6 shows another example of the specific configuration realized by the PCM/PWM converter 2000 and pulse-width modulator 2001. That is, the combination of the PCM/PWM converter 2000 and pulse-width modulator 2001 is realized by the combination of a $\Delta \Sigma$ modulator 2020 and a PDM/PWM converter circuit 2021 (where 'PDM' stands for 'Pulse-Duration Modulation').

In FIG. 6, the $\Delta \Sigma$ modulator 2020 is supplied with the word clock signal WCK, bit clock signal BCK, and 24-bit digital audio signal SDI (see FIGS. 7A to 7I). In synchronization with the word clock signal WCK and bit clock signal BCK, 24-bit digital audio signals SDI are subjected to pulse-duration modulation (PDM) in the $\Delta \Sigma$ modulator 2020, which in turn provides pulse-duration modulated audio signals to the PDM/PWM converter circuit 2021. Thus, the PDM/PWM converter circuit 2021 converts pulse-duration modulated audio signals to pulse-width modulation (PWM) signals.

Figure 8:
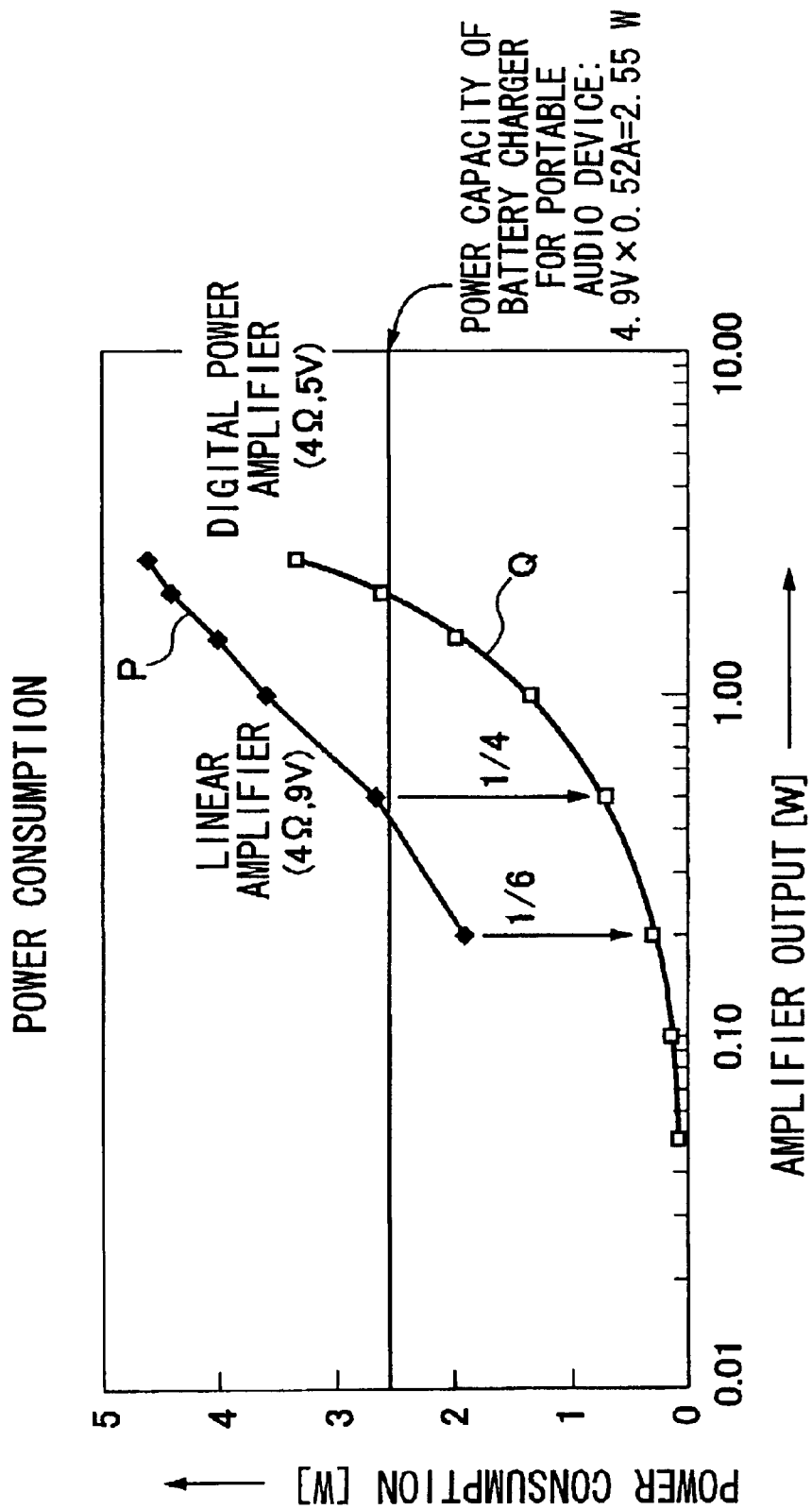
FIG. 8 is a graph showing characteristics of power consumption with respect to a general-purpose linear amplifier and a digital power amplifier for use in the portable audio device.
Figure 9:
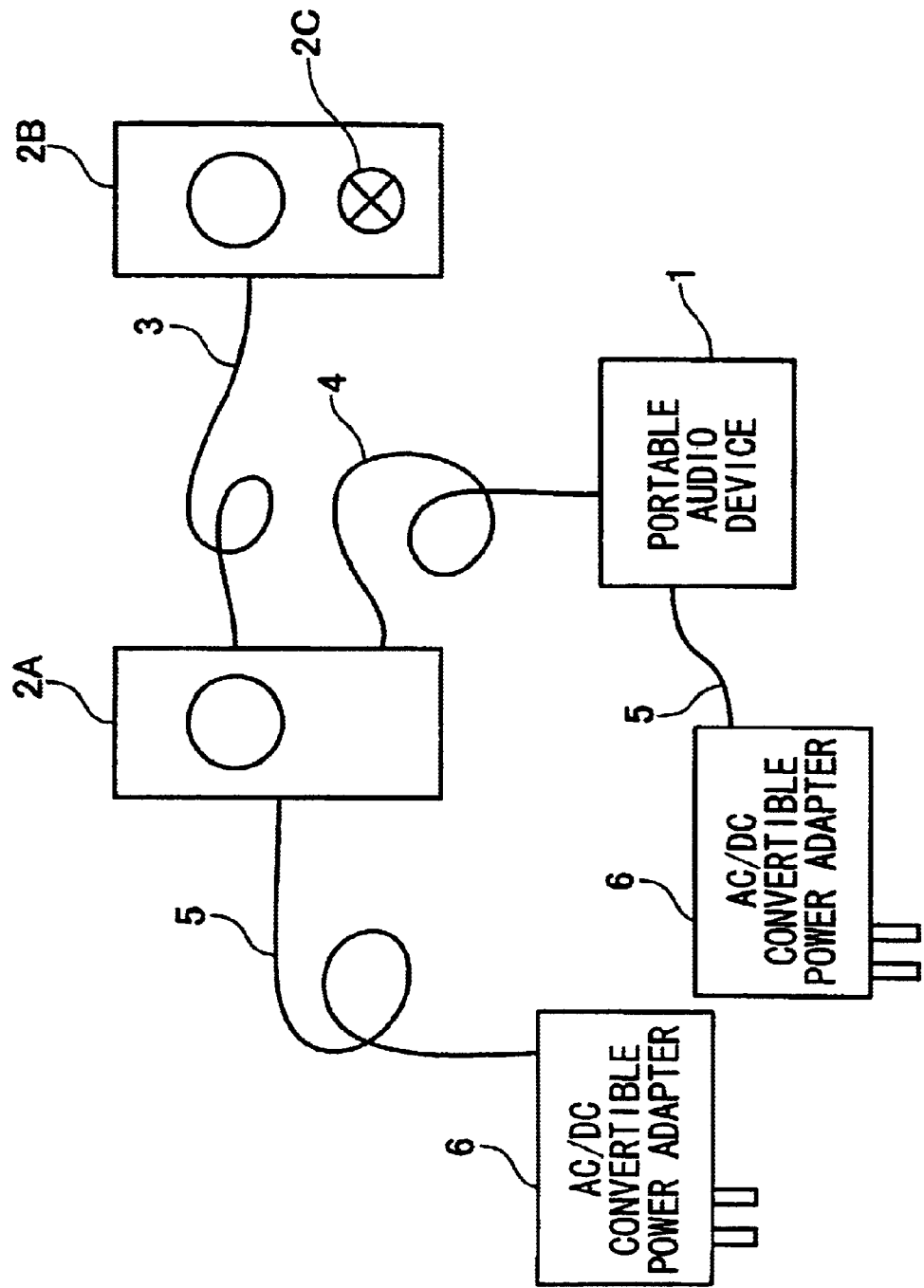
FIG. 9 is a simplified layout realizing an audio system incorporating a portable audio device.

Next, descriptions will be given with respect to the comparison between the digital power amplifier of 2.5 W output and the conventional linear amplifier in power consumption as well as the power output of the AC/DC convertible power adapter for use in the battery charge of the portable audio device. FIG. 8 shows power consumption characteristics with respect to the digital power amplifier of 2.5 W output (employed in the present embodiment) and the general-purpose linear amplifier of 2.5 W output. Specifically, the curve P represents the general-purpose linear amplifier characteristic, and the curve Q represents the digital power amplifier characteristic.

It may be obviously observed from the graph of FIG. 8 that in the normal-use output range between 200 mW and 1 W, the power consumption of the digital power amplifier can be reduced maximally ⅙ times smaller than the power consumption of the linear amplifier.

Normally, portable telephones having music playback functions are sold on the market as portable audio devices, wherein the electric power required for battery chargers of portable telephones may be approximately calculated as follows:

$$DC\ 4.9\ V \times 0.52\ A = 2.55\ W$$

The aforementioned power output of 2.55 W is plotted as a solid line in FIG. 8. In this regard, the general-purpose linear amplifier at '200 mW' output mode requires power consumption of about 1.9 W, which reaches 70% of the power output of 2.55 W of the AC/DC convertible power adapter for use in the battery charger. This indicates that only 30% power remains usable for charging the portable telephone.

The general-purpose linear amplifier at '500 mW' output mode requires larger power consumption, which is greater than the power output of 2.55 W of the AC/DC convertible power adapter. That is, it becomes impossible to charge the battery of the portable telephone while playing back the music. For this reason, the general-purpose linear amplifier cannot guarantee the practical use unless the power capacity of the battery charger is increased to 5 W or more.

The energy difference between the consumed power and output of the amplifier may cause heat, which should be radiated or dissipated from the amplifier. Therefore, the general-purpose linear amplifier requires heat radiation measures such as the heat radiation board or heat radiation space, which should be additionally secured therein. This inevitably causes an increase of the size of the casing of the base unit of the battery charger.

In contrast, the present embodiment uses the digital power amplifier whose power consumption at '200 mW' output mode is only 300 mW, which is about 12% of 2.55 W output of the power supply source. That is, remaining 88% of the output of the power supply source can be used for charging the portable telephone. In addition, the power consumption of the digital power amplifier at '1 W' output mode is 1.25 W, which is about 49% of 2.55 W output of the power supply source. That is, remaining 51% of the output of the power supply source can be used for charging the portable telephone.

Further, the power consumption of the digital power amplifier at '2 W' output mode reaches 2.55 W, which is equal to 2.55 W output of the power supply source.

Because of the aforementioned advantages, the battery charger incorporating the digital power amplifier having the characteristic Q (see FIG. 8) for use in the portable audio device can embody the compact audio system, which can perform charging operation for the portable audio device (e.g., portable telephone) during music playback in progress without increasing the output of the AC/DC convertible power adapter and without increasing the size of the casing of the base unit of the battery charger because the digital power amplifier does not require heat radiation measures.

As described heretofore, this invention provides a variety of effects and technical features, which will be described below.

(1) The battery charger of this invention provides an ability to transmit digital audio signals to the circuit block of the portable audio device, which is connected with the base unit of the battery charger via the connector. Therefore, during the charging operation in progress, the portable audio device can reliably reproduce digital audio signals with relatively low source voltage. Herein, it is possible to secure a high sound quality without causing deterioration of sound quality because the portable audio device directly receives digital audio signals transmitted thereto without intervention of digital-to-analog conversion. In addition, it is possible to provide heat reduction in association with reduction of consumed power.

(2) The base unit of the battery charger provides a digital power amplifier that amplifies digital audio signals given from the portable audio device, which is installed in and connected with the battery charger via the connector. During charging operation in progress, the digital power amplifier is connected with the circuit block of the portable audio device to reproduce digital audio signals. Therefore, regardless of the property of audio signals that are analog or digital, the digitized audio signals are certainly used for playback due to the provision of the digital power amplifier during the charging operation in progress. This contributes to conservation of electricity for use in playback of audio signals. Hence, it is possible to secure a sufficiently high charging power for the battery of the portable audio device. This is because the digital power amplifier has a good efficiency in power consumption and produces only a small amount of heat during operation thereof.

(3) Therefore, the battery charger of this invention allows the portable audio device to drive speakers by audio signals while the charging operation is in progress by use of the indoor AC power source. Because the digital power amplifier has a good efficiency in power consumption and produces a very small amount of heat during operation, it is unnecessary to provide heat radiation measures such as heat radiation space, which was conventionally required to radiate a relatively large amount of heat from the battery charger. For this reason, it is easy to install the digital power amplifier in the base unit of the battery charger, regardless of its limited space and insufficient heat radiation characteristic. That is, the battery charger as a whole can be considerably downsized compared with conventional ones; therefore, it is possible to design a 'compact' audio system incorporating a portable audio device and a battery charger.

(4) Adequate connectors can be arranged for the base unit of the battery charger; therefore, the user is able to construct a desired audio system using a portable audio device and a battery charger, which can be connected with desired speakers.

(5) The same power source can be used for the charging operation and playback operation of the portable audio device. Therefore, the audio system can be driven by a single power source. In addition, since the battery charger uses the digital power amplifier having a good efficiency in power consumption, it is unnecessary to provide an additional special power control circuit for realizing power sharing between the charging operation and playback operation of the portable audio device. This contributes to a simplicity in circuit configuration of the battery charger and audio system.

(6) The battery charger has a selector for allowing the user to manually select a desired terminal from among plural terminals for use in transmission of signals within the connector by which the portable audio device and the base unit of the battery charger are connected. This provides connectibility or compatibility for the battery charger, which can be arbitrarily connected with various types of portable audio devices.

(7) Due to the provision of the digital power amplifier in the battery charger, it is possible to reliably secure a high sound quality with a relatively low source voltage.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A battery charger for charging a battery incorporated in a portable audio device, comprising:
   a connector to connect with the portable audio device; and
   a circuit block to charge the battery of the portable audio device via the connector,
   wherein the circuit block includes a digital power amplifier to receive digital audio signals transmitted thereto from the portable audio device via the connector,
   and the digital cower amplifier includes a pulse width modulator to assist in converting the digital audio signals into pulse width modulation signals and a power driver to receive the pulse width modulation signals, to create audio signals, and to output the audio signals.

2. A battery charger according to claim 1, wherein the circuit block reproduces the digital audio signals transmitted thereto from the portable audio device.

3. A battery charger according to claim 1, wherein the digital power amplifier amplifies the digital audio signals from the portable audio device to create amplified audio signals and outputs the amplified audio signals.

4. A battery charger according to claim 1 further including at least one terminal for outputting the output signals processed in the circuit block.

5. A battery charger according to claim 2 further including at least one terminal for outputting the reproduced audio signals processed in the circuit block.

6. A battery charger according to claim 3 further including at least one terminal for outputting the amplified audio signals processed in the circuit block.

7. A battery charger according to claim 1, wherein a single power source is used to both charge the battery of the portable audio device and to provide power to the digital power amplifier.

8. A battery charger according to claim 2, wherein a single power source is used to both charge the battery of the portable audio device and to provide power to the digital power amplifier.

9. A battery charger according to claim 3, wherein a single power source is used to both charge the battery of the portable audio device and to provide power to the digital power amplifier.

10. A battery charger according to claim 1 further including a selector, wherein the connector has a charging terminal utilized to charge the battery of the portable audio device as well as a plurality of terminals for use in transmission of signals to the portable audio device, so that the selector is operated to select a desired terminal from among the plurality of terminals of the connector.

11. A battery charger according to claim 2 further comprising a selector, wherein the connector has a charging terminal utilized to charge the battery of the portable audio device as well as a plurality of terminals for use in transmission of signals to the portable audio device, so that the selector is operated to select a desired terminal from among the plurality of terminals of the connector.

12. A battery charger according to claim 3 further comprising a selector, wherein the connector has a charging terminal utilized to charge the battery of the portable audio device as well as a plurality of terminals for use in transmission of signals to the portable audio device, so that the selector is operated to select a desired terminal from among the plurality of terminals of the connector.

13. The battery charger of claim 1, wherein the digital power amplifier further includes a pulse code modulation/pulse width modulation converter to assist the pulse width modulator in converting the digital audio signals into the pulse width modulation signals.

14. The battery charger of claim 1, wherein the digital power amplifier further includes a pair of switching devices to receive the audio signals from the power driver and to transmit the audio signals to the at least one terminal.

15. An audio system comprising:
a portable audio device;
a battery charger that comprises a connector to connect with the portable audio device, and a circuit block to charge a battery of the portable audio device via the connector, wherein the circuit block includes a digital power amplifier to receive digital audio signals transmitted thereto from the portable audio device via the connector; and
at least one terminal for outputting audio signals amplified by the digital power amplifier to a speaker,
wherein the digital power amplifier includes a pulse width modulator to assist in converting the digital audio signals into pulse width modulation signals, and a power driver to receive the pulse width modulation signals, to create the audio signals, and to output the audio signals to the at least one terminal.

16. An audio system according to claim 15, wherein a single power source is used to both charge the battery of the portable audio device and to provide cower to the digital power amplifier.

17. An audio system according to claim 15 further including a selector, wherein the connector has a charging terminal utilized to charge the battery of the portable audio device as well as a plurality of terminals for use in transmission of signals to the portable audio device, so that the selector is operated to select a desired terminal from among the plurality of terminals of the connector.

18. The audio system of claim 15, wherein the digital power amplifier further includes a pulse code modulation/pulse width modulation converter to assist the pulse width modulator in converting the digital audio signals into pulse width modulation signals.

19. The audio system of claim 15, wherein the digital power amplifier further includes a pair of switching devices to receive the audio signals from the power driver and to transmit the audio signals to the at least one terminal.

* * * * *